United States Patent

Shen et al.

[15] 3,674,843

[45] July 4, 1972

[54] SUBSTITUTED PHENYLSULFAMYL SALICYLIC ACIDS AND DERIVATIVES THEREOF

[72] Inventors: Tsung-Ying Shen; Bruce E. Witzel; Gordon L. Walford, all of Westfield, N.J.

[73] Assignee: Merck & Co., Inc., Rahway, N.J.

[22] Filed: April 20, 1970

[21] Appl. No.: 30,298

Related U.S. Application Data

[63] Continuation-in-part of Ser. No. 836,605, June 25, 1969.

[52] U.S. Cl. .................260/519, 260/247.1, 260/293.73, 260/326.3, 260/397.7, 260/463, 260/465 D, 260/470, 260/479 R, 260/516, 260/559 T, 424/248, 424/267, 424/274, 424/304, 424/310, 424/319, 424/324

[51] Int. Cl. ........................................................C07c 143/78

[58] Field of Search ..................260/519, 471 R, 397.7, 470

[56] References Cited

OTHER PUBLICATIONS

Fieser, L. F. Organic Chemistry, 3rd Edition, (1956) pub. by Reinhold Pubng. Corp. (QD257F5), page 590 relied upon.

*Primary Examiner*—Lorraine A. Weinberger
*Assistant Examiner*—L. Arnold Thaxton
*Attorney*—Michael C. Sudol, Jr., Harry E. Westlake, Jr. and I. Louis Wolk

[57] ABSTRACT

Substituted phenyl sulfamyl or sulfonamido salicylic acids and non-toxic pharmaceutical accepted salts, esters, amides and various derivatives thereof are claimed. Also a method of treating inflammation which comprises administering various substituted phenyl sulfamyl or sulfonamido salicylic acids and the various derivatives are also claimed. The substituted phenyl sulfamyl or sulfonamido salicylic acids described herein have anti-inflammatory, anti-pyretic and analgesic activity.

13 Claims, No Drawings

SUBSTITUTED PHENYLSULFAMYL SALICYLIC ACIDS AND DERIVATIVES THEREOF

CROSS REFERENCE TO RELATED APPLICATIONS

This application is a continuation-in-part of our co-pending U.S. application Ser. No. 836,605 filed June 25, 1969.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally this invention relates to new substituted-phenylsulfamyl or sulfonamido salicylic acids and a derivative thereof and the use of these acids and derivatives as a method of treating inflammation. Compounds covered by this invention are useful in that they have anti-inflammatory activity and are effective in the prevention and inhibition of edema and granuloma tissue formation. In addition, some of them have a useful degree of anti-pyretic, analgesic, diuretic, anti-fibrinolytic and hypo-glycemic activity.

DESCRIPTION AND PREFERRED EMBODIMENTS

The invention relates to the use of new substituted-phenylsulfamyl or sulfonamido salicylic acids and derivatives thereof in treating inflammation. More specifically, the invention relates to the use of the following compounds (Formula I) as a method of treating inflammation. These compounds are:

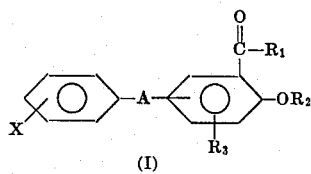

(I)

wherein $R_1$ may be
hydroxy,
amino,
lower alkoxy (such as methoxy, ethoxy, butoxy, pentoxy, etc.)
loweralkylamino (such as methylamino, propylamino, pentylamino),
di(lower alkyl)amino (such as dimethylamino, dibutylamino, propylpentylamino)
diloweralkylaminoloweralkylamino,
diloweralkylaminoloweralkoxy,
hydroxyloweralkoxy (such as 3-hydroxypropoxy, 2-hydroxypropoxy, 4-hydroxybutoxy),
polyhydroxyloweralkoxy (such as 2,3-dihydroxy propoxy, 2,3,4,5,6-pentahydroxyhexyloxy),
loweralkoxyloweralkoxy (such as ethoxyethoxy phenylloweralkoxy (benzyloxy, phenethoxy),
phenoxy,
substituted phenoxy (such as loweralkoxyphenoxy, diloweralkylaminophenoxy, halophenoxy, or loweralkanoylaminophenoxy,
loweralkanoylamino-loweralkoxy,
hydrazino, hydroxylamino,
N-morpholino,
anilino,
hydroxyloweralkylamino and a
naturally occurring amino acid radical with attachment at the N, such as glycine, phenylalanine, proline, methionine and taurine;
$R_2$ is hydrogen
acyl (preferably lower acyl such as formyl, acetyl, propionyl, butyryl, etc.),
alkyl (preferably loweralkyl such as methyl, ethyl, propyl, isopropyl, butyl, pentyl, etc.),
alkoxy carbonyl (preferably loweralkoxy carbonyl such as methoxycarbonyl, ethoxycarbonyl, hexyloxycarbonyl, etc.)
wherein the $OR_2$ group is always ortho to the COOH group;
$R_3$ is hydrogen,
halogen (such as chloro, bromo, fluoro, or iodo, preferably fluoro or chloro),
haloalkyl (preferably haloloweralkyl such as trifluoromethyl, etc.),
alkyl (preferably loweralkyl, such as methyl, ethyl, propyl, isopropyl, butyl, pentyl, etc.),
cycloalkyl (such as cyclopropyl, cyclobutyl, cyclopentyl, cyclohexyl and cycloheptyl),
alkoxy (preferably loweralkoxy such as methoxy, ethoxy, isopropoxy or butoxy),
and X is hydrogen,
hydroxy,
alkoxy (preferably loweralkoxy such as methoxy, ethoxy, isopropoxy or butoxy, etc.),
acyloxy (such as benzoyloxy, acetoxy or propionoxy),
halogen (such as chloro, bromo, fluoro or iodo, preferably fluoro or chloro),
haloalkyl (preferably haloloweralkyl such as trifluoromethyl, etc.),
nitro,
amino,
alkylamino (preferably lower alkylamino such as methylamino, propylamino, pentylamino, etc.),
dialkylamino (preferably diloweralkylamino such as dimethylamino, dibutylamino, propylpentylamino, etc.),
acylamino (preferably lower acylamino such as formylamino, acetylamino, propionylamino, butyrylamino, etc.),
mercapto,
alkylmercapto (preferably loweralkylmercapto such as methylmercapto, ethylmercapto, etc.),
alkylsulfinyl (preferably loweralkylsulfinyl such as methylsulfinyl, ethylsulfinyl, butylsulfinyl, etc.),
alkylsulfonyl (preferably loweralkylsulfonyl, such as methylsulfonyl, ethylsulfonyl, butylsulfonyl, etc.),
alkylaminoalkyl (preferably loweralkylaminoloweralkyl such as methylaminomethyl, ethylaminomethyl, etc.),
dialkylaminoalkyl, (preferably diloweralkylaminoloweralkyl such as diethylaminoethyl etc.),
hydroxyalkyl (preferably hydroxyloweralkyl such as hydroxymethyl, hydroxyethyl, hydroxypropyl, etc.),
alkoxyalkyl (preferably loweralkoxyloweralkyl such as methoxymethyl, methoxyethyl, ethoxyethyl, ethoxypropyl, etc.),
mercaptoalkyl (preferably mercaptoloweralkyl such as mercaptomethyl, mercaptoethyl, etc.),
alkylmercaptoalkyl (preferably loweralkylmercaptoloweralkyl such as methylmercaptomethyl, ethylmercaptoethyl, ethylmercaptopropyl, etc.),
cyano,
carboxy,
carboalkoxy (carbomethoxy, carboethoxy, etc.),
carbamoyl,
aryl (such as phenyl, tolyl, salicyl or halophenyl)
aralkyl (such as benzyl, phenethyl, etc.)
aryloxy,
aralkoxy,
A is $-SO_2-NR-$ or $-NR-SO_2-$
where R is hydrogen or lower alkyl, and the A radical is connected to the 4 or 5 position of the salicylic acid moiety, and the non toxic pharmaceutically acceptable salts thereof. Also the compounds of the above invention wherein X is
fluoro,
hydroxy,
haloalkyl,
mercapto,
alkylmercapto,
alkylsulfinyl, alkylsulfonyl,
alkylamino,
diloweralkylamino,
alkylaminoalkyl,
mercaptoalkyl,
alkylmercaptoalkyl,
carboalkoxy,
carbamyl,
aryl,
aralkyl,
aryloxy,
aralkoxy,
acetyl,
are novel compounds and represent a preferred embodiment of this invention.

Preferred compounds of this invention which can be used in a method of treatment are those of Formula I wherein $R_1$ is
hydroxy,
lower alkoxy,
dimethylaminoethoxy
diethylaminoethoxy and
simple amines such as amino, loweralkylamino, diloweralkylamino and morpholino,
$R_2$ is hydrogen,
acetyl,
lower alkyl
(lower) alkoxycarbonyl;
$R_3$ is hydrogen,
halogen,
lower alkyl
trifluoromethyl,
lower alkoxy;
X is halo,
loweralkoxy,
diloweralkylamino,
loweralkylthio and the oxidation products of loweralkylthio; such as loweralkylsulfonyl and loweralkylsulfinyl, and
A is as above defined.

The preferred novel compounds are those preferred compounds described immediately above except that X is limited to fluoro, diloweralkylamino, $CH_3SO-$, $CH_3SO_2-$ and $CH_3S-$.

Some representative preferred compounds which can be used in a method of treatment are those listed below, and those listed under representative preferred novel compounds.
[5-(p-chlorophenylsulfonamido)-salicylic acid; 5(p-chlorophenylsulfamyl)-salicylic acid; ]

Furthermore, representative compounds which are novel compounds are those listed below:

5-(m-, o- or p-fluorophenylsulfonamido)-salicylic acid, 5-[N-(m-, o- or p-methylsulfinylphenylsulfamyl)]-salicylic acid,
4-[N-(m-, o- or p-fluorophenylsulfamyl)]-salicylic acid,
5-(m-, o- or p-methylsulfonylphenylsulfonamido)-salicylic acid,
5-(o-, m- or p-methylaminophenylsulfonamido)-salicylic acid
5-[N-(m-, o- or p-trifluoromethylphenylsulfamyl)]-salicylic acid,
4-[N-(m-, p- or o-fluorophenylsulfamyl)]-salicylic acid, etc.

We have found that the compounds of Formula I have anti-inflammatory activity and are effective in the prevention and inhibition of edema and granuloma tissue formation as shown by reduction of edema in the rat's foot induced by the injection of an inflammatory (phlogistic) agent into the rat's foot.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have anti-pyretic, analgesic, diuretic, anti-fibrinolytic and hypo-glycemic activity and would be administered and used in the same manner and in the same dosage ranges as if they were being used to treat inflammation as discussed further on.

The treatment of inflammation in accordance with the method of the present invention is accomplished by orally administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises internally administering to a patient (animal or human), a compound of Formula I, particularly an especially preferred compound admixed with a non-toxic pharmaceutical carrier such as exemplified above. The compounds of Formula I and particularly the especially preferred compounds will be present in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

Compounds of this invention may be prepared according to the following flow diagrams:

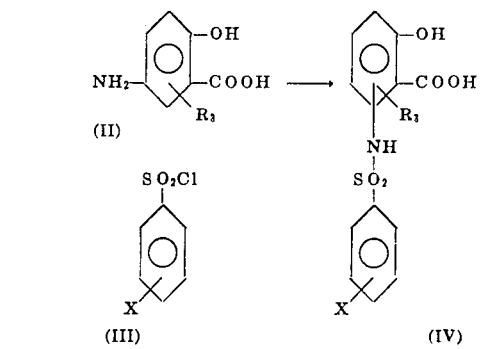

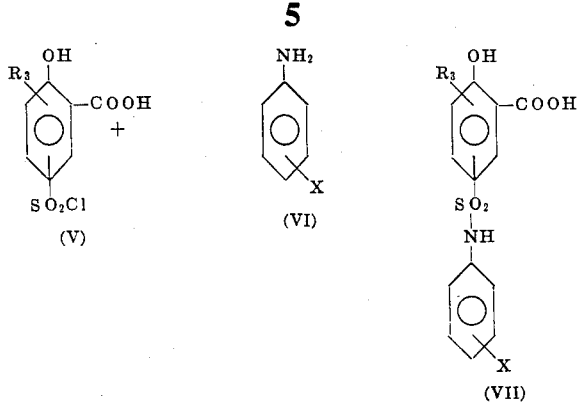

wherein X and R₃ are as above defined.

Thus, a 5-amino salicylic acid compound (Formula II) can be reacted with a substituted benzenesulfonyl halide preferably a substituted benzenesulfonyl chloride (Formula III) to form a substituted phenyl sulfonamido salicylic acid compound of Formula IV.

The substituted phenylsulfamyl compounds of Formula VII can be prepared by taking a 5-chlorosulfonylsalicylic acid compound (Formula V) and reacting it with an aniline compound (Formula VI) to form the desired substituted sulfamyl salicylic acid compound (Formula VII). Various substituted compounds wherein X and R₃ are the various group defined can be prepared by starting with the appropriately substituted starting materials. Details of the various reaction processes are shown in the examples.

The compounds of this invention wherein $R_1$ is a group such that an ester is the final compound (i.e., $R_1$ is alkoxy) are prepared by any esterification procedure using an esterifying agent containing the appropriate R group. For example, the salicylic acid compounds of this invention may be reacted with the appropriate lower alkanol (preferably methanol) in the presence of a strong acid such as HCl or sulfuric acid and the like to form the desired compound. The reaction may occur at room temperature over an extended period of time or at elevated temperatures.

The compounds of this invention wherein $R_1$ is a group such that an amide is the final compound (i.e., where $R_1$ is amino or substituted amino) may be prepared by any suitable amidation reaction. For example, the salicylic acid compound (preferably the methyl or ethyl ester) may be reacted with ammonia, ammonium hydroxide or an amine compound at any suitable temperature (room temperature to reflux). When the amino group is desired, it is preferred to carry out the reaction with ammonia in a bomb at temperatures about 100° C. to form the desired $R_1$ (amino) compound.

The salts of the final acid compound of this invention may be prepared by any of the well-known metathesis procedures. For example, the salicylic acid compound may be reacted with an inorganic base such as sodium hydroxide, potassium hydroxide etc. or with an amine such as N-N-diethylaminoethanol, etc. and the like.

Other substituted sulfamyl or sulfonamido salicylic acid compounds, particularly those having substituents in the phenyl or in the salicylic acid portion of the molecule can be prepared from related substituted salicylic acid compounds by conventional procedures shown in the prior art.

Following are a list of examples which describe this invention in greater detail. The examples should be construed as illustrations of the invention and not limitations.

EXAMPLE 1

5-[N-(p-Fluorophenylsulfamyl)]salicylic acid

An intimate mixture of 5-(chlorosulfonyl)salicylic acid (0.01 m.), p-fluoroaniline (0.01 m.) and anhydrous sodium acetate (0.01 m.) is heated to 130° C. and kept at this temperature for 2 hours, protected from moisture with a calcium chloride drying tube. The mixture is cooled, dissolved in dilute sodium carbonate solution, filtered, acidified, and the 5-[N-(p-fluorophenylsulfamyl)]-salicylic acid collected.

The above reaction can also be carried out using a solvent as diluent, and other X-substituted anilines in place of p-fluoroaniline.

When o- or m-fluoroaniline, m-(trifluoromethyl) aniline and other appropriately substituted anilines are used in place of p-fluoroaniline in the above example, the corresponding sulfonamides are obtained.

The various 4'[N-(p-substituted phenyl sulfamyl)]-salicylic acid compounds can be prepared by using the appropriate 4-(chlorosulfonyl) salicylic acids in place of the 5-(chlorosulfonyl) salicylic acid compounds. By using the appropriately substituted N-alkylanilines in place of p-fluoroaniline used above, there are obtained the appropriately substituted N-alkyl sulfonamides.

EXAMPLE 2

5-[N-(p-Fluorophenylsulfamyl)]salicylic acid amide

A mixture of methyl 5-[N-(p-fluorophenylsulfamyl)]salicylate and o-fluoro aniline is heated at 100° C. in a sealed tube for 6 hours. After cooling, water is added and the 5-[N-(p-fluorophenylsulfamyl)] p-fluoro phenylsalicylamide, m.p. 257°–258° C. is collected.

A mixture of methyl 5-[N-(p-fluorophenylsulfamyl)]-salicylate and concentrated ammonium hydroxide is heated at 100° C. in a sealed tube for 6 hours. After cooling, water is added and the 5-[N-(p-fluorophenylsulfamyl)]-salicylamide is collected.

When monomethylamine, dimethylamine, ethylamine, diethylamine, morpholine, piperidine, etc. are used in place of ammonium hydroxide, the corresponding amides are obtained.

Other appropriately substituted starting materials can be used and the appropriately substituted amide will be formed.

Similarly, 5-(p-fluorophenylsulfonamido)salicylamides or substituted salicylamides can be prepared by using 5-(p-fluorophenylsulfonamido)salicylic acid as the starting material in place of 5-[N-(p-fluorophenylsulfamyl)]-salicylic acid used above.

EXAMPLE 3

2-Acetoxy-5-[N-(p-fluorophenylsulfamyl)]benzoic acid

To a mixture of 5-[N-(p-fluorophenyl sulfamyl)] salicylic acid (.04 mole) in 15 ml. of anhydrous pyridine is added 28 ml. of acetic anhydride and the resultant mixture heated on the steam bath for 1.5 hours. The mixture is kept free from moisture during this time. On cooling, the mixture is added to a stirred 500 ml. portion of water, the aqueous system extracted well with chloroform, the chloroform extracts washed with 1N hydrochloric acid, water, and then dried over anhydrous magnesium sulfate. Concentration of the filtered solution yields 2-acetoxy-5-[N-(p-fluorophenylsulfamyl)] benzoic acid.

When propionic or butyric anhydride is used in place of acetic anhydride in the above example, the corresponding propionoxy or butyroxy compounds are obtained. When other appropriately substituted salicylic acids are used as starting materials in place of the 5-[N-(p-fluorophenylsulfamyl)] salicylic acid used above or 5-(p-fluorophenyl)sulfonamido salicylic acid used below, the corresponding acyloxybenzoic acids are obtained.

When 5-(p-fluorophenylsulfonamido)salicylic acid is used in place of 5-[N-(p-fluorophenylsulfamyl)]salicylic acid used above and the same procedure followed, there is produced 2-acetoxy-5-(p-fluorophenyl sulfonamido)benzoic acid.

EXAMPLE 4

N,N-diethylaminoethyl 5-[N-(p-fluorophenyl sulfamyl)]-salicylate

To a mixture of 0.01 mole of 5-[N-(p-fluoro-phenylsulfamyl)] salicylic acid and 0.01 mole of N,N-diethylethanolamine in 100 ml. of anhydrous tetrahydrofuran is added a solution of 0.01 mole of dicyclohexylcarbodiimide in a minimum of the same solvent. The mixture is stoppered, shaken well and allowed to stand overnight. The precipitated dicyclohexylurea is removed by filtration. The filtrate is concentrated in vacuo, the residue partitioned between ether and hydrochloric acid, the layers separated, the aqueous layer washed once with fresh ether and neutralized with saturated bicarbonate solution. Extraction with chloroform, followed by removal of the chloroform in vacuo yields N,N-diethylaminoethyl 5-[N-(p-fluoro-phenylsulfamyl)] salicylate.

Other esters can be prepared by following the above procedure but using the appropriately substituted starting materials.

EXAMPLE 5

5-(p-Fluorophenylsulfonamido) salicylic acid

To 7.65 g. of 5-amino salicylic acid in 6% aqueous sodium hydroxide solution (80 ml.) is added a mixture of p-fluorobenzenesulfonyl chloride (10 g.) and water, and the mixture shaken at 40°–50° C. for 5 hours. 5 G. of sodium hydroxide is added, the mixture shaken for a further 3 hours at 60° C., the mixture allowed to cool, treated with carbon, filtered, the pH adjusted to 3, and the 5-(p-fluorophenyl sulfonamido)- salicylic acid collected, m.p. 212°–213.5° C.

The above reaction may also be carried out using pyridine (or similar base) at ca 40° C., as solvent and base.

When o- or m-fluorobenzenesulfonyl chloride, m-trifluorobenzenesulfonyl chloride and other X-substituted benzenesulfonyl chlorides are used in place of p-fluorobenzenesulfonyl chloride in the above example, the corresponding appropriately substituted sulfonamido compounds are obtained.

When using 4-amino salicylic acid in place of 5-amino salicylic acid used above, there are obtained the appropriately substituted 4-(benzenesulfonamido) salicylic acid compounds. Similarly, if one uses the appropriately substituted N-methylaminosalicylic acid in place of 5-aminosalicylic acid used above, there are produced the appropriately substituted N-methylsulfonamides.

EXAMPLE 6

Sodium 5-(p-Fluorophenylsulfonamido) salicylate

Solutions of 5-(p-fluorophenylsulfonamido) salicylic acid in methanol and one equivalent of sodium hydroxide in water are mixed, heated to solution, filtered and the filtrate concentrated in vacuo to yield sodium 5-(p-fluorophenylsulfonamido) salicylate.

When potassium hydroxide is used in place of sodium hydroxide in the above example, the corresponding potassium salt is obtained.

The sodium or potassium 5-[N-(p-fluorophenyl-sulfamyl)] salicylate can be prepared by following the procedure above but using 5-[N-(p-fluorophenylsulfamyl)]-salicylic acid in place of 5-(p-fluorophenylsulfonamido)-salicylic acid used above.

We claim:

1. A compound of the formula:

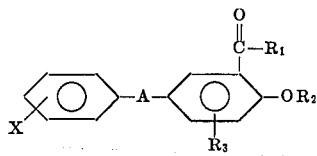

or a non-toxic pharmaceutically acceptable salt wherein
$R_1$ is hydroxy,
  lower alkoxy,
$R_2$ is hydrogen,
$R_3$ is hydrogen,
X is fluoro,
  diloweralkylamino,
  loweralkyl sulfonyl,
  loweralkyl sulfinyl, trifluoromethyl
A is —$SO_2$—NR—, —NR—$SO_2$,
where R is hydrogen or lower alkyl, and the A radical is connected to the 4 or 5 position of the salicylic acid moiety.

2. A compound according to claim 1 wherein $R_1$, is hydroxy and $R_2$ and $R_3$ are hydrogen
X is fluoro
A is $NHSO_2$—
thus forming
5-[N-(p-fluorophenylsulfamyl)]-salicylic acid.

3. A compound according to claim 1 wherein $R_1$ is hydroxy and, $R_2$ and $R_3$ are hydrogen
X is fluoro
A is —$SO_2$—NH—
thus forming
5-(fluorophenylsulfonamido)-salicylic acid.

4. A compound according to claim 1 wherein $R_1$ is hydroxy and, $R_2$ and $R_3$ are hydrogen
X is fluoro
A is —$NHSO_2$—
thus forming
4-[N-(fluorophenylsulfamyl)]salicylic acid.

5. A compound according to claim 1 wherein $R_1$ is hydroxy and, $R_2$ and $R_3$ are hydrogen
X is fluoro
A is —$SO_2NH$—
thus forming
4-(fluorophenylsulfonamido)salicylic acid.

6. A compound according to claim 1 wherein $R_1$ is hydroxy and, $R_2$ and $R_3$ are hydrogen
X is methylsulfonyl
A is —$SO_2NH$—
thus forming
4 or 5-(methylsulfonylphenylsulfonamido)salicylic acid 7. A compound according to claim 1 wherein $R_1$ is hydroxy and, $R_2$ and $R_3$ are hydrogen
X is methylsulfonyl and
A is —$NHSO_2$—
thus forming
4 or 5 [N-(methylsulfonylphenylsulfamyl)]salicylic acid 8. A compound according to claim 1 wherein $R_1$ is hydroxy and, $R_2$ and $R_3$ are hydrogen
X is methylsulfinyl
A is —$NHSO_2$—
thus forming
4 or 5-[N-(methylsulfinylphenylsulfamyl)]salicylic acid 9. A compound according to claim 1 wherein $R_1$ is hydroxy and, $R_2$ and $R_3$ are hydrogen
X is methylsulfinyl
A is —$SO_2NH$—
thus forming
4 or 5-(methylsulfinylphenylsulfonamido)salicylic acid.

10. A compounding according to claim 1 wherein $R_1$ is hydroxy and, $R_2$ and $R_3$ are hydrogen
X is trifluoromethyl
A is —$NHSO_2$—
thus forming
4 or 5-[N-(trifluoromethylphenylsulfamyl)]salicylic acid.

11. A compound according to claim 1 wherein $R_1$ is hydroxy and, $R_2$ and $R_3$ are hydrogen
X is trifluoromethyl
A is —$SO_2NH$—
thus forming
4 or 5-(trifluoromethylphenylsulfonamido)salicylic acid.

12. A compound according to claim 1 wherein $R_1$ is hydroxy and, $R_2$ and $R_3$ are hydrogen
X is dimethylamino
A is —$NHSO_2$—
thus forming
4 or 5-[N-(dimethylaminophenylsulfamyl)]salicylic acid.

13. A compound according to claim 1 wherein $R_1$ is hydroxy and, $R_2$ and $R_3$ are hydrogen
X is dimethylamino
A is —$SO_2NH$—
thus forming
4 or 5-(dimethylaminophenylsulfonamido)salicylic acid.

* * * * *